Patented Apr. 1, 1947

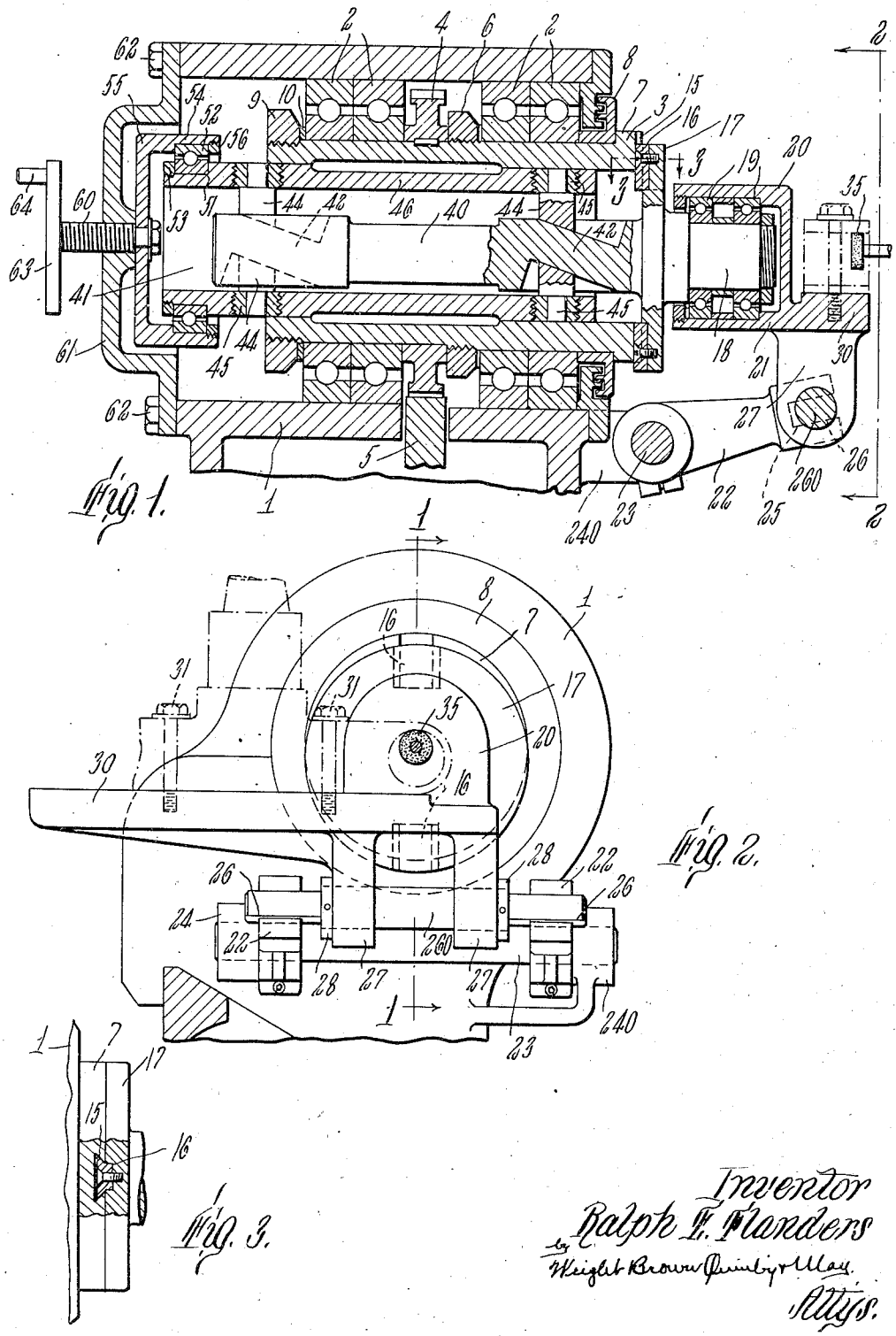

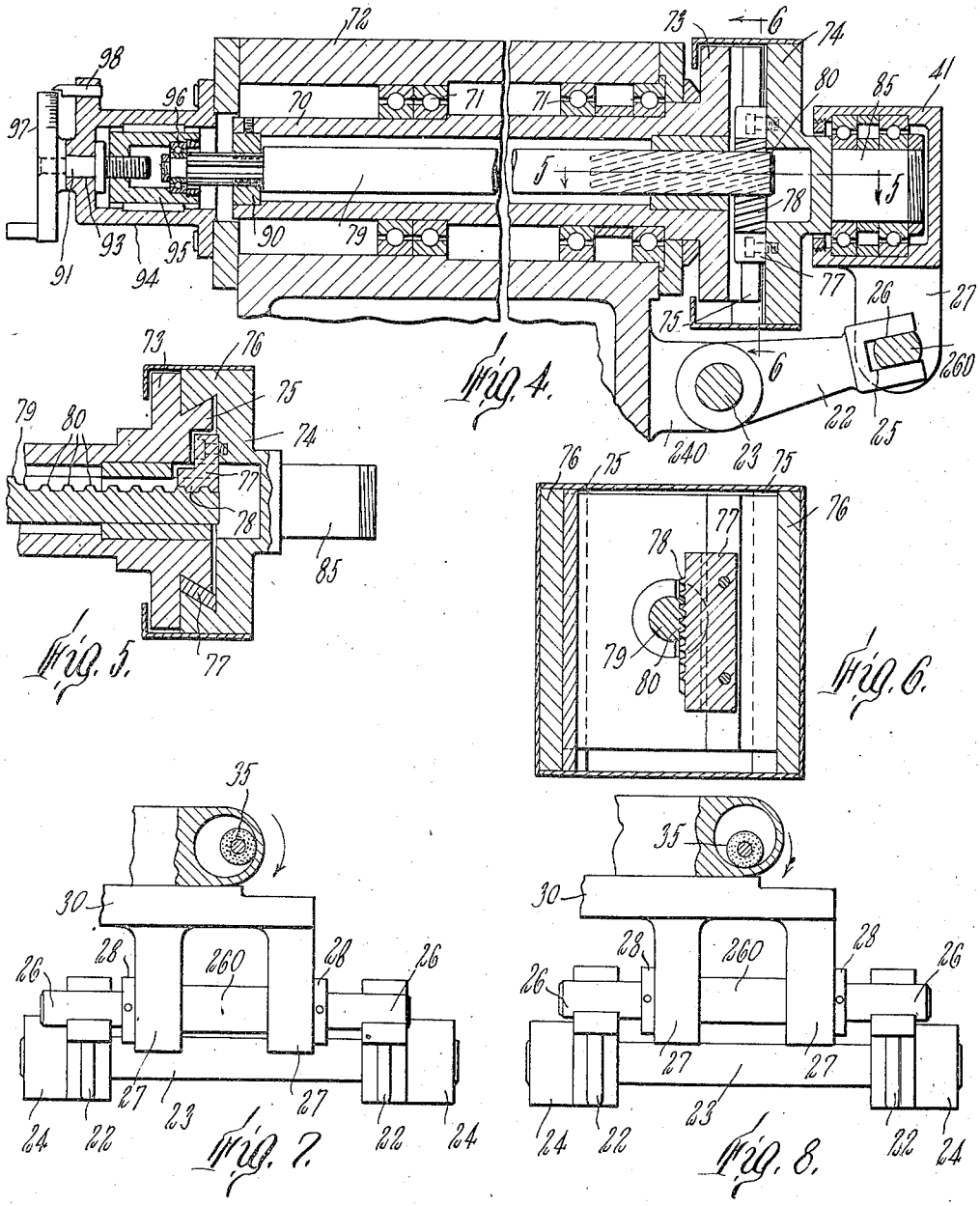

2,418,223

UNITED STATES PATENT OFFICE 2,418,223

WORK SUPPORTING AND MOVING MECHANISM

Ralph E. Flanders, Springfield, Vt., assignor to Jones & Lamson Machine Company, Springfield, Vt., a corporation of Vermont Application August 4, 1944, Serial No. 548,119

4 Claims. (Cl. 51—217)

This invention relates to machines for operating on circular surfaces of work pieces, either internal or external, where it is desired to move the work to present it to the tool, but where it is not convenient, as by reason of the shape or size of the work, or both, to rotate it about the axis of the circular surface. The tooling may be effected by any suitable cutting or grinding tool, and it may be turning, boring, threading, or similar operations as desired.

An object of the present invention is to provide mechanism for supporting the work and moving it bodily, or gyrating it, about a desired axis, while holding it against rotation about that axis.

A further object of the invention is to provide means for changing the radius of gyration of the work and to provide such means which can be actuated readily while the machine is in operation. This provides for feeding and retracting the work with respect to the tool and also facilitates cutting of tapered work.

For a more complete understanding of this invention, reference may be had to the accompanying drawings in which Figure 1 is a fragmentary vertical sectional view on line 1—1 of Figure 2, of an internal grinding machine provided with a work support embodying the invention.

Figure 2 is a vertical sectional view on line 2—2 of Figure 1.

Figure 3 is a detail sectional view on line 3—3 of Figure 1.

Figure 4 is a view similar to Figure 1, but showing a modification.

Figures 5 and 6 are detail sectional views on lines 5—5 and 6—6, respectively, of Figure 4.

Figures 7 and 8 are somewhat diagrammatic views similar to a portion of Figure 2, but showing other angular positions of gyration of the work piece and the holder.

Referring first to the construction shown in Figures 1 to 3, at 1 is shown a machine frame having journaled within antifriction bearings 2 therein, a hollow spindle 3. This spindle may be rotated, and for this purpose, it may have keyed thereto a gear ring 4 with which meshes a gear 5 mounted in any suitable manner in the machine frame and driven by any suitable means (not shown herein). The gear ring 4 is held against one of the bearings 2 as by means of a collar 6 threaded onto the outer face of the spindle 3. At one end the spindle may be provided with an outwardly extending circular flange 7 acting in the nature of a face plate which extends outwardly of a labyrinth packing ring 8. A collar 9 threaded onto the opposite end portion of the spindle bears against a washer 10 and with the flange 7 prevents axial motion of the spindle. The flange 7 which, as before noted, acts in the nature of a face plate for the spindle, is shown as provided with a dovetail slot 15 diametrically across its end face within which may ride a pair of dovetail keys 16 secured to a face member 17 which is thus supported for motion laterally of the axis of the spindle by the sliding engagement of its keys 16 in the dovetail slot 15 of the portion 7. This member 17 is provided with a journal portion 18 which is arranged centered with respect to the diameter along which the member 17 may move. It will be evident, however, that by lateral adjustment of the member 17, the journal portion 18 may be brought toward or from coaxial alinement with the spindle. As shown the journal portion 18 carries the spaced bearings 19 which are supported, in turn, within a mating journal portion 20 of a work holder 21. The work holder 21 is held from rotation with the spindle so that as the spindle rotates, the journal portion 18 rotates within the journal portion 20, but when the journal portion 18 is out of axial alinement with the spindle, it is evident that this portion 18 describes a circular path about the axis of the spindle and with relation to which its own axis is eccentric. Thus a gyratory motion of the work holder 21 is produced in planes perpendicular to the axis of the spindle and with an amplitude depending upon the amount of eccentricity of the journal portion 18 with reference to the axis of the spindle.

Means are provided for holding the work holder 21 against rotation with the journal portion 18. This means may comprise a pair of spaced arms 22 clamped to a rock shaft 23 journaled between spaced bearings 24 and 240 carried by the machine frame 1. These arms 22 which are thus limited to rocking motion in one plane have parallel slotted extremities 25 within which is axially slidably mounted the flattened extremities 26 of a shaft 260, which thus moves parallel to the pivots of the arms 22. This shaft 260 is journaled in a pair of ears 27 depending from the work holder 21. As shown the shaft 260 is held against axial motion with reference to the ears 27 as by a pair of collars 28 pinned to the shaft 260 on opposite sides of the ears. The arms 22 provide for an up and down motion of the work holder 21 as the axis of the journal portion 18 gyrates, while the sliding mounting of the end portions of the shaft 260 in the slot 25 permits a horizontal motion of the work holder 21. Thus the work holder is permitted to gyrate in planes perpendicular to the axis of the spindle, but is prevented from rotating in these planes.

The work holder 21 is provided with a platform 30 on which the work may be secured as by means of screws 31 with the circular portion to be machined coaxial with the spindle. By rotation of the spindle the work is then given a gyratory motion about the axis of the surface to be machined which need not be coaxial with the spindle so that a cutting tool such as a grinding wheel shown at 35 in Figure 1, which may be rotated about its own axis and moved axially into or out of operative relation to the work, may be caused to bear against the desired work surface and be fed therearound as the work is caused to gyrate by the rotation of the spindle. The diameter of the surface upon which the tool operates is controlled partly by the amount of eccentricity or amplitude of gyration of the work support relative to the spindle, and this may be varied as desired, this variation also being employed, if desired, to cause feed of the tool with respect to the diameter of the work surface to be machined. Means are illustrated in these figures whereby this adjustment may be effected while the machine is in operation and without requiring the adjustment mechanism to gyrate with the work or rotate with the spindle. To this end the member 17 is provided with a cam portion 40 shown as in the form of a stem which extends into the hollow interior 41 of the spindle. This stem 40 is provided with a pair of cam portions 42 which extend axially and are inclined in parallel relation transverse to the axis of the spindle 3, and in the diametrical direction of motion of the member 17 laterally of the spindle axis.

Cooperating with the cam portions 42 are mating cam portions 44 having complementally shaped cam faces and which are shown as having shanks seated in collars 45 threaded into lateral openings in a sleeve 46 axially movable within the spindle 3 and having bearing therein. By axial adjustment of the sleeve 46, it is evident that its cam portions 44, acting on the cam portions 42 of the stem 40, will serve to adjust the member 17 laterally to adjust the amount of eccentricity of its journal portion 18 with respect to the axis of the spindle 3. For the purpose of effecting such adjustment readily, the rear end of the sleeve 46 may be provided with a reduced diameter portion 51 on which is carried an antifriction bearing 52 held in position as by a collar 53 threaded onto the rear end of the sleeve 46. This bearing 52 is also seated in an enlarged diameter portion 54 of a hollow shell 55, and is retained in position therein as by the externally threaded collar 56 engaging the open end of the shell 55. This shell 55 has centrally journaled therein and coaxial with the spindle 3, a screw 60 threaded through a cap 61, secured to the machine frame as by the bolts 62, the screw 60 being provided at its outer end with a hand wheel 63 provided with a handle 64 by which it may be rotated. It is evident that this hand wheel 63 may be rotated to adjust the axial position of the sleeve 46 and thereby the amount of eccentricity and amplitude of gyration of the work holder while the machine is in operation and without the adjusting means partaking of either the rotation of the spindle or the gyration of the work support.

In Figures 4 to 6, a modified construction is shown in which the work spindle 70 is journaled within the bearings 71 of the machine frame 72 and is provided with a face plate portion 73 at one end. A face member 74 is mounted for rotary motion with the face plate 73 and also for motion transverse thereto. To this end, the member 73 is provided with spaced guide portions 75 for engagement with spaced guide flanges 76 on a member 74, a tapered gib 77 being employed to take up wear between these parts. The member 74 on its back face has a cam plate 77 secured thereto provided with cam elements consisting of skew rack teeth 78 thereon on one side face. Cooperating therewith is an axially movable cam member in the form of shaft 79 slabbed off on one face, which face is provided with cam elements consisting of skew rack teeth 80, mating the rack teeth 78 of the member 77. By axial motion of the shaft 79 it is evident that the mating engagements of the skew rack teeth will cause lateral motion of the member 74 with reference to the member 73, thus to bring a journal portion 85 of the member 74 toward and from concentricity with the spindle 70. This journal portion 85 cooperates with a mating journal portion on the work holder 41 in the same manner as the journal portion 18 shown in Figures 1 to 3, and the work support 41 may be mounted in the same manner as is shown in Figures 1 and 2 and heretofore described.

The rear end of the shaft 79 may be splined into a sleeve 90 fixed within the rear end of the spindle 70 and it may be moved axially by means of a threaded rod 91 journaled at 93 in the cap 94 secured to the frame 72. Its threads engage mating threads of cage 95 keyed for axial motion in the cap 94, and this cage carries the outer raceway of a ball bearing 96, the inner raceway of which is secured to the end portion of the shaft 79. Angular adjustment of the rod 91 causes axial adjustment of the shaft 79 without reference to angular motion of the shaft 79 or the gyratory motion of the work holder. The extent of such adjustment may be determined by the angular position of the graduated crank disk 97 fixed to the rod 91 and with which a fixed pointer 98 cooperates.

In Figures 7 and 8 are shown diagrammatically driven positions of the work in its gyratory path and with reference to a tool such as a grinding wheel 35 which is also shown in Figures 1 and 2. Thus in Figure 2, the grinding wheel is shown as bearing against the upper inside face of the hole in the work, the face of which is being operated upon, the work holder then being in its lowest position in its gyratory orbit. In Figure 7 the work is shown in the position raised to the central horizontal position, but at its extreme left hand position, so that the wheel bears against the right hand portion of the work face, while in Figure 8 the work piece is shown in its uppermost position in its gyratory path, the grinding wheel then operating at the lowest portion of the internal surface.

From the foregoing description of certain embodiments of this invention, it should be evident to those skilled in the art that various other changes and modifications might be made without departing from the spirit or scope of this invention.

I claim:

1. In combination, a rotary spindle, means for rotating said spindle, a work holder, a face plate having a journal portion, means supporting said face plate at one end of said spindle with capability of adjustment laterally of said spindle and for rotation therewith to produce rotation of said journal portion about the axis of said spindle which by lateral adjustment of said face plate is more or less eccentric to the axis of said journal portion, means for adjusting said face plate laterally of said spindle, said work holder having a journal portion mating said face plate journal portion, and a pivotally supported arm pivotally and slidably connected to said work holder preventing the rotation of said work holder with said spindle while providing for gyratory motion of said holder with eccentric rotation of said face plate journal portion.

2. In combination, a rotary hollow spindle, a face member supported on one end of said spindle for motion transverse to the axis of said spindle, said member having a journal portion movable from and toward said axis by such transverse motion of said member, a skew rack cam portion carried by said face member, a cam member within said face member having skew rack teeth engaging said skew rack cam portion, a work holder having a journal portion operatively engaging the journal portion of said face member, means restricting the motion of said work holder to a gyratory motion in planes perpendicular to the axis of said spindle with an amplitude depending upon the transverse adjustment of said face member, means for adjusting said cam member axially to thereby so adjust said face member, and means for rotating said spindle.

3. In combination, a rotary spindle, means for rotating said spindle, a work holder, a face plate having a journal portion, means supporting said face plate at one end of said spindle with capability of adjustment laterally of said spindle and for rotation therewith to produce rotation of said journal portion about the axis of said spindle which by lateral adjustment of said face plate is more or less eccentric to the axis of said journal portion, means for adjusting said face plate laterally of said spindle, said work holder having a journal portion mating said face plate journal portion, an arm pivoted for swinging motion in one plane, and a shaft carried by said arm transverse to said plane, said work holder being connected to said shaft for relative rocking and axial motion.

4. In combination, a rotary spindle, means for rotating said spindle, a work holder, a face plate having a journal portion, means supporting said face plate at one end of said spindle with capability of adjustment laterally of said spindle and for rotation therewith to produce rotation of said journal portion about the axis of said spindle which by lateral adjustment of said face plate is more or less eccentric to the axis of said journal portion, means for adjusting said face plate laterally of said spindle, said work holder having a journal portion mating said face plate journal portion, a pair of parallel arms pivoted for swinging motion on a common axis, and a shaft slidably carried by said arms for motion parallel to the pivots of said arms, said work holder being connected for rocking motion on said shaft.

RALPH E. FLANDERS.

REFERENCES CITED

The following references are of record in the file of this patent:

UNITED STATES PATENTS

| Number | Name | Date |
|---|---|---|
| 2,314,483 | De Vlieg | Mar. 23, 1943 |
| 793,391 | Olsson | June 27, 1905 |
| 1,631,188 | Baumberger | June 7, 1927 |
| 1,632,600 | Hoagland | June 14, 1927 |
| 1,656,332 | Knowles | Jan. 17, 1928 |
| 1,674,973 | Kline et al. | June 26, 1928 |
| 1,755,349 | Casse | Apr. 22, 1930 |